United States Patent [19]

Naylor

[11] 4,352,912
[45] Oct. 5, 1982

[54] CONVERSION OF ALPHA-METHYLSTYRENE-TYPE MONOMERS IN THE FORMATION OF COPOLYMERS WITH CONJUGATED DIENE MONOMERS

[75] Inventor: Floyd E. Naylor, Bartlesville, Okla.

[73] Assignee: Phillips Petroleum Company, Bartlesville, Okla.

[21] Appl. No.: 278,124

[22] Filed: Jun. 29, 1981

Related U.S. Application Data

[60] Division of Ser. No. 192,798, Oct. 1, 1980, Pat. No. 4,302,558, which is a continuation of Ser. No. 36,267, May 4, 1979, abandoned.

[51] Int. Cl.$^3$ ............... C08F 297/00; C08F 297/04
[52] U.S. Cl. ................................................. 525/314
[58] Field of Search ........................................ 525/314

[56] References Cited

U.S. PATENT DOCUMENTS

| 2,975,160 | 3/1961 | Zelinski | 260/83.7 |
|---|---|---|---|
| 3,265,765 | 8/1966 | Holden et al. | 260/876 |
| 3,278,508 | 10/1966 | Kahle et al. | |
| 3,294,768 | 12/1966 | Wofford | |
| 3,324,191 | 6/1967 | Wofford | |
| 3,331,826 | 7/1967 | Talcott | 260/94.2 |
| 3,366,611 | 1/1968 | Wofford | 260/84.7 |
| 3,431,323 | 3/1969 | Jones | 260/880 |
| 3,459,700 | 8/1969 | Richards | 260/33.6 |
| 3,496,154 | 2/1970 | Wofford | 260/84.7 |
| 3,825,623 | 2/1974 | La Flair | 260/879 |
| 3,830,880 | 8/1974 | De La Mare | |
| 3,912,793 | 10/1975 | Hoviie et al. | 260/880 |
| 3,956,426 | 5/1976 | Schepers | |
| 4,248,984 | 2/1981 | Bi et al. | 525/314 |
| 4,260,694 | 4/1981 | Schwab | 525/314 |

OTHER PUBLICATIONS

Whitby–Synthetic Rubber, pp. 746–747 (Wiley) 1954.
Karoly "An Alpha–Methylstyrene Isoprene Block Copolymer" Div. Poly. Chem., Poly. Reprints vol. 10, #2, pp. 837–842.

Primary Examiner—William F. Hamrock

[57] ABSTRACT

Copolymers of alpha-methylstyrene-type monomers and conjugated diene monomers are prepared by polymerizing an alpha-methylstyrene monomer using a first polar activator, adding a small amount of a conjugated diene monomer to cap the block of alpha-methylstyrene-type monomer polymer, and further adding a conjugated diene monomer and polymerizing with a second polar activator effective for copolymerization of residual alpha-methylstyrene-type monomer. The resulting copolymer can be coupled to form linear or radial block copolymers.

10 Claims, No Drawings

CONVERSION OF ALPHA-METHYLSTYRENE-TYPE MONOMERS IN THE FORMATION OF COPOLYMERS WITH CONJUGATED DIENE MONOMERS

FIELD OF THE INVENTION

This is a divisional application of Ser. No. 192,798 filed Oct. 1, 1980, now U.S. Pat. No. 4,302,558 patented Nov. 24, 1981; which is a continuation of Ser. No. 36,267 filed May 4, 1979, now abandoned.

The invention pertains to copolymers of alpha-methylstyrene-type-monomers with conjugated diene monomers. In another aspect, the invention pertains to processes of copolymerization of alpha-methylstyrene-type monomers with conjugated diene monomers. In a further aspect, the invention pertains to methods of providing high conversion of alpha-methylstyrene-type monomers in copolymerization with conjugated diene monomers. In still a further aspect the invention pertains to uncoupled linear copolymers, coupled linear copolymers, and coupled radial copolymers, of alpha-methylstyrene-type monomers with conjugated diene monomers.

BACKGROUND OF THE INVENTION

Alpha-methylstyrene-type monomers have been polymerized using solution polymerization procedures employing monofunctional anionic initiators such as the organolithium initiators. Polar additives have been employed to improve the rate of polymerization of such as alpha-methylstyrene. Subsequently, butadiene has been added to form a block of such as polybutadiene. The resulting product can be coupled, if desired. This generalized procedure is described in such as U.S. Pat. No. 3,825,623. Such polymers are useful in molded goods, hot melt adhesives, and other purposes.

Unfortunately, the prior art processes have been faced with a major problem of low conversion of the alpha-methylstyrene-type monomer, such as described in U.S. Pat. No. 3,825,623 at column 3.

An alpha-methylstyrene-type monomer, when polymerized anionically, establishes a reaction equilibrium monomers polymer. Additional monomer does tend to force the formation of additional polymer; or, the use of low temperature does permit the formation of additional polymer with lower monomer presence, in effect tending to push the reaction toward the desired polymer. However, in order to effectively polymerize a conjugated diene thereon, the polymerization temperature must be raised. The natural tendency is for the alpha-methylstyrene-type monomer:polymer equilibrium to immediately return in the direction of unreacted monomer, thus depolymerizing the poly(alpha-methylstyrene-type monomer) block. THis can occur with unseemly rapidity. This difficulty means variable sizes of poly(alpha-methylstyrene-type monomer) block, inadequate incorporation of the alpha-methylstyrene-type monomer, more monomer remains present after the conjugated diene polymerization, and monomers must be separated and recycled for economy. Sometimes the separation procedures from the polymerization diluent are difficult.

What is needed is a method to enforce good substantial conversion in the polymerization of the alpha-methylstyrene-type monomer, and then to hold it, avoiding depolymerization, while nearly copolymerizing thereon the conjugated diene and at the same time further copolymerizing any remaining alpha-methylstyrene-type monomer to relatively high conversion.

BRIEF DESCRIPTION OF THE INVENTION

I have discovered a process for preparing copolymers of alpha-methylstyrene-type monomers with conjugated diene monomers with increased conversion of the alpha-methylstyrene-type monomer to polymer. My process involves a capping step after polymerizing the alpha-methylstyrene-type monomer to hold it, and to prevent depolymerization when additional solvent is added, or when the polymerization temperature is raised, for polymerization of the major proportion of the conjugated diene monomer to polymer.

In my process, an alpha-methylstyrene-type monomer is polymerized in the presence of a first polar activator under moderately low temperature anionic solution polymerization conditions; a small amount of conjugated diene monomer is added while still at the low temperature and polymerized to form a protective cap to prevent depolymerization; and then further conjugated diene monomer is added as desired and polymerized at moderately elevated polymerization temperatures to form polyconjugated diene using a second polar activator to assure complete copolymerization of the conjugated diene with the residual alpha-methylstyrene-type monomer. The second polar activator can be present initially, be added at the capping stage, but must at least be present by the third stage polymerization of the conjugated diene.

To so-prepared block copolymer can be recovered by conventional termination procedures. This termination can include linear coupling, or coupling with multifunctional agents to produce a branched copolymer.

DETAILED DESCRIPTION OF THE INVENTION

In accordance with my process, an alpha-methylstyrene-type monomer is polymerized with an organomonolithium initiator under solution polymerization conditions at a first polymerization temperature employing a first polar activating agent (polar activator) until polymerization equilibrium is obtained between monomer:polymer.

In a second type, a small capping amount of conjugated diene is added, preferably with additional polymerization diluent, and polymerized while maintaining the first lower polymerization temperature to provide a capping operation effective to prevent depolymerization of the poly(alpha-methylstyrene-type monomer) block so far formed. Residual alpha-methylstyrene-type monomer remains present since no appreciable copolymerization occurs unless the second polar activator is present, and the temperature is raised.

In the third step, additional conjugated diene monomer is added and polymerized sufficient to form the desired size (polyconjugated diene), preferably together with additional polymerization diluent, and in the presence of an effective amount of a second polar activator at an increased second higher polymerization temperature for effective conjugated diene polymerization. The dual activator system provides further substantial copolymerization of residual alpha-methylstyrene-type monomer. I have obtained as much as 86 weight percent total conversion of alpha-methylstyrene-type monomer, and more usually about 80 weight percent.

The fourth step is termination of living lithium ends, either termination as such; or by coupling with coupling agents to form linear or radial branched block copolymers.

Any broad ratio of alpha-methylstyrene-type monomer:conjugated diene monomer in polymerization is suitable in the preparation of copolymers according to my invention. Generally, the ratio of charged monomers will be about 95:5 to 5:95, more usually 45:75 to 75:25 weight of total conjugated diene:alpha-methylstyrene-type monomer charged to polymerization.

Alpha-Methylstyrene-Type Monomers

Alpha-methylstyrene itself is the presently preferred monomer due to availability and relatively favorable economics. However, alpha-methylstyrene-type monomers broadly are useful and operable. Typically, these range from 9 to 24 carbon atoms per molecule. Substituted alpha-methylstyrenes having one or more substituents on the aromatic ring are suitable in which the substituents are selected from alkyl, cycloalkyl, aryl, or combination radicals, each having one to eight carbon atoms per substituent.

Nonlimiting examples include: alpha-methylstyrene, alpha-methyl-4-butylstyrene, alpha-methyl-3,5-di-t-bensylstyrene, alpha-methyl-3,4,5-trimethylstyrene, alpha-methyl-4-bensylstyrene, alpha-methyl-4-chlorohexylstyrene, and the like, alone, or mixtures.

Conjugated Diene Monomers

Conjugated dienes employed in the process of my invention include any of the conjugated dienes, preferably the hydrocarbon conjugated dienes, known to polymerize with lithium initiators under anionic solution polymerization conditions. On an exemplary basis, these conjugated dienes for availability contain 4 to 12 carbon atoms per molecule, preferably 4 to 8 carbon atoms per molecule, and preferably for industrial purposes those of 4 or 5 carbon atoms per molecule. The conjugated dienes form the elastomeric block of the resulting copolymer.

Examples of the conjugated dienes include the presently preferred 1,3-butadiene and isoprene, as well as 2,3-dimethyl-1,3-butadiene, 2-methyl-1,3-pentadiene, 2,3-dimethyl-1,3-pentadiene, 2-methyl-3-ethyl-1,3-pentadiene, 2-phenyl-1,3-butadiene, and the like, alone, or in admixture.

Initiators

Any of the hydrocarbon monolithium initiators known in the anionic solution polymerization art can be employed. Typically these can be represented by RLi in which R is a hydrocarbon radical and can be aliphatic, cycloaliphatic, or aromatic, containing at least one carbon atom per molecule. The number of carbon atoms and consequently the molecular weight of the hydrocarbon monolithium initiator is not limited as far as operability is concerned, though those of up to about 20 carbon atoms are more readily available. Most frequently employed are the aliphatic monolithium types. Exemplary initiators include such as n-butyllithium sec-butyllithium, n-decyllithium, phenyllithium, 1-naphthyllithium, p-tolyllithium, cyclohexyllithium, eicosyllithium, and the like, alone usually, though mixtures are suitable.

The amount of initiator employed depends on the polymer molecular weight desired and thus varies widely. Typically, the amount of initiator is in the approximate range of 0.05 to 20 milliequivalents of lithium per 100 grams of total monomer. The initiator conveniently is employed as a solution in a hydrocarbon polymerization diluent.

Polymerization Diluents

Polymerization is conducted by contacting the monomer charge with the monolithium initiator in a suitable polymerization diluent. Suitable diluents include any of the paraffinic, cycloparaffinic, or aromatic hydrocarbons known to the art, used alone or in admixture, typically of 4 to 10 carbon atoms per molecule.

Various substances are known to be detrimental to the initiator and the living polymer, including such as carbon dioxide, oxygen, and water. It is desirable that the reactants, the polymerization apparatus, and the reactant mixture be freed of these materials as well as any other materials which inactivate the respective reactive species present throughout the process. Any of the known methods for removing such contaminents can be used. Therefore, wherever a diluent is employed in the process, it is preferred that the diluent be substantially free of impurities such as those listed above. In this connection it is desirable to remove the air and moisture from the reaction vessel in which the polymerization is conducted.

Examplary species include such as n-hexane, n-heptane, cyclohexane, cyclopentane, benzene, toluene, the xylenes, 2,2,4-trimethylpentane, and the like. Cyclohexane currently is preferred for ease of handling, high solubility of polymer, and availability.

First Step Polymerization

The alpha-methylstyrene-type monomer is polymerized as a relatively concentrated solution in a polymerization diluent. The monomer:diluent weight ratio can vary somewhat, but should represent a reasonably concentrated solution of monomer, such as about 9:1 to 1:5, preferably 5:1 to 1:2, weight ratio of first charge of monomer:diluent. Such a relatively concentrated polymerization solution is desirable since the polymerization equilibrium, that is, the extent of monomer conversion, is significantly influenced by the amount of diluent present. The higher solvent levels tend to shift the equilibrium in the direction of unreacted monomer, rather than in the desired direction of polymer.

The choice of the first lower polymerization temperature is influenced by the desired combination of solution viscosity, polymerization rate, and monomer conversion. A compromise is necessary. Low temperature polymerization favors higher alpha-methylstyrene-type monomer conversion to polymer, but this is at the expense of lower polymerization rates and higher solution viscosities. Polymerization of the alpha-methylstyrene-type monomer presently preferably is conducted at a first polymerization temperature in the range of about 0° C. to 40° C., more preferably about 3° C. to 35° C. Undesirable side reactions occur at higher temperatures and the percentage conversion which can be attained rapidly diminishes.

The polymerization of the alpha-methylstyrene-type monomer is conducted in the presence of an effective amount of a first polar activator, optionally in the presence of the second polar activator. The first polar activator increases the polymerization rate or propagation rate of the alpha-methylstyrene-type monomer without increasing the rate of undesirable side or termination reactions as long as relatively short polymerization times are employed.

Suitable as first polar activators are polar compounds which do not contain an active hydrogen atom. These polar compounds can contain oxygen, sulphur, as well as nitrogen. It is preferred that the activator have a dielectric constant of between 2 and 9. Suitable first polar activators include such as dimethyl ether, diethyl ether, diamyl ether, dimethoxyethane, bis(2-ethoxyethyl) ether, tetrahydrofuran, hexamathylphosphoramide, tributylamine, and hexamethylenetetramine, and mixtures. Presently preferred is tetrahydrofuran.

The first polar activator normally is added to the polymerization mixture in the amount of about 0.1 to 10 parts by weight per 100 parts by weight of total monomers, preferably 1 to 5 parts to prevent undesired side reactions and to maintain ultimate vinyl content within the desired ranges.

The pressure employed can be as convenient. Preferably, a pressure is employed sufficient to maintain monomer and diluent substantially in the liquid phase.

The polymerization time can vary widely as may be convenient, and will, of course, be affected by the polymerization temperature chosen. Generally, the alpha-methylstyrene-type monomer is allowed to polymerize for less than about 120 minutes, since, at longer polymerization times, termination of the living polymer tends to occur. At this stage, despite the favorable influences of lower temperature, minimal diluent, first polar activator, and short polymerization time, there are present substantial proportions of the alpha-methylstyrene-type monomer, and the polymer at this stage itself is not stable.

Capping

In the second step, a small amount of conjugated diene is added, conveniently as a dilute solution in polymerization diluent. This capping step is the polymerization of the small amount of conjugated diene and is conducted within the relatively low first polymerization temperature range described for the first step polymerization of the alpha-methylstyrene-type monomer. This step and resulting small block of poly(conjugated diene) provides a capping of the poly(alpha-methylstyrene-type monomer styryllithium). The cap avoids depolymerization when the polymerization temperature is raised and/or when further relatively large amounts of polymerization diluent are added in the third step. Both of these conditions normally are utilized for optimum polymerization of the conjugated diene added later, and both factors would otherwise tend to cause depolymerization of the block of poly(alpha-methylstyrene-type monomer) so far produced. The small suitable affective amount of conjugated diene added for capping the live poly(alpha-methylstyrene-type monomer) is defined as an amount of at least about 1 mole per mole of living alpha-methylstyrene-type polymer. The upper limit of this amount is not critical, but it is preferable to keep it as low as possible to reduce depolymerization induced by the heat of reaction of diene polymerization. Usually it will be less than about 100 moles. The weight ratio of additional polymerization diluent to conjugated diene added for the capping step generally is about 10:1 to 1000:1, although the conjugated diene can be added without dilution if desired depending on the polymerization solution viscosity.

The polymerization time for forming the poly(conjugated diene) cap is short in duration. The completion of the poly(conjugated diene) cap formation is indicated by the disappearance of the red color of the poly(alpha-methylstyrene-type monomer styryllithium) in the polymerization mixture. This normally requires about 1 to 120 minutes.

While this step protects the polymer of the alpha-methylstyrene-type monomer against depolymerization, yet the substantial amounts of unpolymerized alpha-methylstyrene-type monomer are still present primarily in solution in the diluent.

Third Step Polymerization

The second or further addition of conjugated diene is to form the poly(1,3-conjugated diene) to provide the desired rubbery component of the copolymer. This third polymerization usually uses additional polymerization hydrocarbon diluent so as to keep the reaction mixture viscosity low enough to be adequately stirred. The conjugated diene is preferably polymerized at a higher second polymerization temperature than at the lower first polymerization temperature used for alpha-methylstyrene-type monomer polymerization since higher temperatures favor a desirably higher rate of conjugated diene polymerization and also further reduce the solution viscosity. The temperature of the polymerization mixture now can safely be raised, and additional polymerization diluent added, without depolymerization since the poly(alpha-methylstyrene-type monomer styryllithium) has been protectively capped by the capping step described above.

Polymerization of the conjugated diene is conducted in the presence of a second polar activator, which is an alkali metal alkoxide. These alkali metal alkoxides are organic compounds of an alkali metal other than lithium, more particularly of sodium, potassium, rubidum, or cesium. Any of the alkoxides of this nature are suitable for my process.

Conveniently, the alkoxides can be represented by R'OM in which M represents the alkali metal just mentioned, and R' is an aliphatic, cycloaliphatic, armoatic, or combination hydrocarbon radical, and for convenience usually is of the order of 1 to 20 carbon atoms.

These include the sodium, potassium, rubidium and casium salts of such as methyl alcohol, ethyl alcohol, n-propyl alcohol, isopropyl alcohol, tert-butyl alcohol, tert-amyl alcohol, n-hexyl alcohol, cyclohexyl alcohol, eicosyl alcohol, 2-butenyl alcohol, 4-methylcyclohexyl alcohol, 3-hexenyl alcohol, 2,5-decadienyl alcohol, 3-cyclopentenyl alcohol, 4,6-di-n-butyldecyl alcohol, 4,8-dodecadienyl alcohol, allyl alcohol, benzyl alcohol, 3(4-tolyl)propyl alcohol, phenol, 1-naphthol, 2-naphthol, 2,6-di-tert-butyl-4-methylphenol (Ionol), 2,4,6-tri-tert-butylphenol, 2,6-di-tert-butyl-4-phenylphenol, 2,6-di-sec-butyl-4-methylphenol, and the like, alone or in admixture.

Especially suitable are potassium alkoxides, and presently preferred from my work is potassium tertiary amyloxide. During polymerization of the conjugated diene with the alkali metal alkoxide and the first polar activator which, of course, is still present since it was added during the polymerization of the alpha-methylstyrene-type monomer, further residual unreacted alpha-methylstryene-type monomer is randomly copolymerized with the conjugated diene monomer, thus substantially increasing the overall alpha-methylstyrene conversion.

The amount of polymerization diluent to be added at this third stage polymerization, can vary widely. It is convenient to use the same polymerization diluent in each stage to avoid possible complexities in ultimate separation and recycle. Generally, sufficient polymerization diluent is added such that the ratio of total weight of diluent to total weight of all monomers added in all steps of the polymerization process is about 3:1 to 25:1, preferably about 5:1 to 10:1.

The amount of alkali metal alkoxide added is such that the M:Li molar ratio is within the broad range of about 10:1 to 1:10, presently preferably about 5:1 to 1:5 because of improved effectiveness, wherein M represents the alkali metal other than lithium.

The temperature range normally employed for this step of the process is in the range of about 0° C. to 140° C., preferably about 50° C. to about 120° C. for convenience and improved effectiveness. The polymerization time for formation of the poly(conjugated diene) normally is in the range of about 2 minutes to several hours, preferably 5 minutes to 30 minutes.

At the completion of the polymerization steps, the living polymers, polymers containing carbon-lithium moieties and thus capable of propagating further polymerization, are terminated. In the context of this specification, the term "termination" refers either to termination as such of the polymer-lithium by conventional noncoupling type of final termination by removal of the active lithium such as with water, acid, lower alcohol, or the like, which remove the lithium and substituting a hydrogen; or by reaction with a coupling agent. The term "coupling" as herein employed is a generic term meaning the bringing together and joining by means of a central coupling atom or coupling moiety two or more of the living lithium-terminated polymer chains so as to produce either a linear coupled product, or radially branched coupled product. Of course, it is recognized that a coupling agent is not necessarily 100 percent efficient, and that any coupling procedure usually results in some species remaining uncoupled, while in the case of a polyfunctional coupling agent containing three or more coupling entities, that some of the coupling moieties may result in a partially linear coupled faction as well as a substantial radially coupled faction in the coupled product.

A wide variety of compounds suitable for such purposes can be employed. Among the suitable coupling agents are the multivinylaromatic compounds, multiepoxides, multiisocyanates, multiimines, multialdehydes, multiketones, multianhydrides, multiesters which are the esters of polyalcohols with monocarboxylic acids, or esters of polyacids with monohydric alcohols, and the diesters which are esters of monohydric alcohols with dicarboxylic acids, monoesters of either type, multihalides, carbon monoxide, carbon dioxide, and the like. Furthermore, compounds containing more than one type of functional group are useful as coupling agents.

Examples of suitable multivinylaromatic compounds include divinylbenzene, 1,2,4-trivinylbenzene, 1,3-divinylnaphthalene, 1,8-divinylnaphthalene, 1,3,5-trivinylnaphthalene, 2,4-divinylbiphenyl, and the like. The divinylaromatic hydrocarbons are preferred, particularly divinylbenzene in either its ortho, meta, or para isomer. Commerical divinylbenzene which is a mixture of the three isomers and other compounds is quite satisfactory.

While any multiepoxide can be used, preferred are those which are liquid since they are more readily handled and form a relatively small nucleus for the radial polymer. Especially preferred among the mutliepoxides are the epoxidized hydrocarbon polymers such as epoxidized liquid polybutadiene and the epoxidized vegetable oils such as epoxidized soybean oil and epoxidized linseed oil. Other epoxy compounds such as 1,2; 5,6; 9,10-triepoxydecane, and the like, also can be used.

Examples of suitable multiisocyanates include benzene-1,2,4-triisocyanate, naphthalene-1,2,5,7-tetraisocyanate, and the like. Especially suitable is a commercially available product known as PAPI-1, a polyarylopolyisocyanate having an average of three isocyanate groups per molecule and an average molecular weight of about 380. Such a compound can be visualized as a series of isocyanate-substituted benzene rings joined through methylene linkages.

The multiimines, which are also known as multiaziridinyl compound, preferably are those containing 3 or more aziridine rings per molecule. Examples of such compounds include the triaziridinyl phosphine oxides or sulfides such as tri(1-aziridinyl)phosphine oxide, tri(2-methyl-1-aziridinyl)phosphine oxide, tri(2-ethyl-3-decyl-1-aziridinyl)phosphine sulfide, and the like.

The multialdehydes are represented by compounds such as 1,4,7-naphthalene tricarboxyaldehyde, 1,7,9-anthracene tricarboxyaldehyde, 1,1,5-pentane tricarboxyaldehyde, and similar multialdehyde-containing aliphatic and aromatic compounds.

The multiketones can be represented by compounds such as 1,4,9,10-anthracenetetrone, 2,3-diacetonylcylohexanone, and the like.

Examples of the multianhydrides include pyromellitic dianhydride, styrene-maleic anhydride copolymers, and the like.

Examples of the di- and multiesters include diethyl adipate, triethyl citrate, 1,3,5-tricarbethoxybenzene, and the like.

Among the multihalides, presently preferred are the silicon tetrahalides such as silicon tetrachloride, silicon tetrabromide, and silicon tetraiodide; and the trihalohydrocarbylsilanes such as trifluorophenylsilane, trichloroethylsilane, tribromobenzylsilane, and the like. Also preferred are the multihalogen-substituted hydrocarbons, such as 1,3,5-tri(bromomethyl)benzene, 2,5,6,9-tetrachloro-3,7-decadiene, and the like, in which the halogen is attached to a carbon atom which is alpha to an activating group such as an ether linkage, a carbonyl group, or a carbon-to-carbon double bond. Substituents inert with respect to lithium atoms in the terminally reactive polymer can also be present in the active halogen-containing compounds. Alternatively, other suitable reactive groups different from the halogen as described above can be present.

Examples of compounds containing more than one type of functional group include 1,3-dichloro-2-propanone, 2,2-dibromo-3-decanone, 3,5,5-trifluoro-4-octanone, 2,4-dibromo-3-pentanone, 1,2; 4,5-diepoxy-3-pentanone, 1,2; 4,5-diepoxy-3-hexanone, 1,2; 11,12-diepoxy-8-pentadecanone, 1,2; 18,19-diepoxy-7,14-eicosanedione, and the like.

In addition to the silicon multihalides as described hereinabove, other metal multihalides, particularly those of tin, lead, or germanium, also can be readily employed as coupling and branching agents.

Difunctional counterparts of these agents also can be employed, whereby a linear polymer rather than a branched polymer results.

For the purpose of coupling, one equivalent of coupling agent per equivalent of lithium is considered an optimum amount for maximum branching. Any range of treating agent can be employed, depending on the degree of coupling desired. Broadly, about 0.5 to 1.5 equivalents per equivalent of lithium usually is used.

The coupling agent can be added neat, or alternately added in an inert hydrocarbon solution, such as in cyclohexane. The coupling agent can be added in one batch, or alternately may be added incrementally or continuously. The coupling reaction normally is conducted at the same temperature as employed in the third polymerization step, this being broadly about 0° C. to 140° C., preferably about 50° C. to 120° C. The time for the coupling reaction can range from a few minutes to several hours, preferably from 1 minute to 30 minutes. The polymerization solution with the added coupling agents are agitated for the duration of the coupling reaction.

Polymer Recovery

After the completion of the terminating or coupling reaction, the polymer can be recovered by methods well known in the art. In one suitable method water or alcohol is added to the mixture to precipitate the polymer. The polymer then is separated from the alcohol or water and diluent by any suitable means such as decantation or filtration. It has also been found advantageous to add an antioxidant, such as 2,6-di-t-butyl-4-methylphenol, to the polymer mixture prior to precipitation of the polymer. It is, of course, to be realized that it is within the scope of the invention to employ other suitable means to recover the polymer from solution such as, for example, steam stripping. After separation from the solvent mixture and alcohol or water by filtration or other suitable means, the polymer is dried.

EXAMPLES

The runs included for exemplary purposes are provided to assist in an understanding of the invention. Particular species and components used, operating conditions, and other values, should be considered as illustrative, and not limitative of the reasonable scope of my invention, which scope is based on my overall disclosure.

EXAMPLE I

This example demonstrates the improvement in alpha-methylstyrene monomer conversion in the preparation of alpha-methyltyrene-butadiene block copolymers when potassium tertiary amyloxide is added to the polymerization mixture during polymerization of the butadiene. Alpha-methylstyrene-butadiene block copolymers were prepared according to the general procedure of Recipe Y:

| Recipe I | |
|---|---|
| Step I | |
| Alpha-methylstyrene, parts by weight | 51 |
| Cyclohexane, parts by weight | 14 |
| n-Butyllithium, mehm[a] | 2.0 |
| Tetrahydrofuran, parts by weight | 1.4 |
| Polymerization temperature, °C. | 30 |
| Polymerization time, minutes | 30 |
| Step II | |
| 1,3-Butadiene, parts by weight | 2 |
| Cyclohexane, parts by weight | 59 |
| Polymerization temperature, °C. | 30 |
| Polymerization time, minutes | 30 |
| Step III | |
| 1,3-Butadiene, parts by weight | 47 |
| Cyclohexane, parts by weight | 530 |
| Potassium t-amyloxide (KTA), mehm[a] | Variable |
| Polymerization temperature, °C. | 70 |
| Polymerization time, minutes | Variable |
| Step IV | |
| Silicon tetrachloride, mehm[a] | 2.4 |
| Reaction temperature, °C. | 70 |
| Reaction time, minutes | 8 to 13[b] |

[b]Silicon tetrachloride was added incrementally in four batches, the first batch being 5 times the amount of each of the other three batches. Increments were added at one minute intervals, and the reaction mixture allowed to stir for 5 or 10 minutes after addition of the last increment.

The conversion of alpha-methylstryene to polymer, the weight percent alpha-methylstyrene in the final polymer, and the weight percent block poly(alpha-methylstyrene) in the final polymer, as a function of the amount of potassium t-amyloxide added during polybutadiene block formation are shown in Table I:

TABLE I

| | | | | Alpha-methylstyrene | | |
|---|---|---|---|---|---|---|
| Run No.[a] | KTA, mehm | K/Li | Step III Time, min. | Conversion, Wt. % | Wt. % in Polymer | Block, Wt. % |
| 1 | 0 | — | 30 | 61 | 40 | 39 |
| 2 | 0.38 | 1/5.3 | 17 | 67 | 41 | 39 |
| 3 | 0.76 | 1/2.6 | 15 | 70 | — | — |
| 4 | 1.14 | 1/1.75 | 10 | 80 | 43 | 36 |
| 5 | 1.52 | 1/1.3 | 7 | 67 | — | — |

[a]Polymers prepared according to Recipe I.

The data in Table I demonstrate that the presence of KTA during the polymerization of the butadiene results in higher conversion of the alpha-methylstyrene to polymer as compared to polymerization in the absence of KTA. Moreover, the percent conversion is a function of the amount of KTA. These data also demonstrate that the increased conversion results in the incorporation of alpha-methylstyrene as random copolymer, as shown by the higher total percent incorporated into the polymer but with no increase in block poly(alpha-methylstyrene).

That the polymerization time of butadiene polymerization over the range employed (Step III) does not influence the percent conversion, as might be suggested by these data, is shown in Example II.

EXAMPLE II

This example demonstrates that the increase in alpha-methylstyrene conversion is a funcion of KTA concentration, and not a funcion of polymerization time, over the range of time employed.

Polymers were prepared according to Recipe I of Example I. Alpha-methylstyrene conversion at variable polymerization times is shown in Table II:

TABLE II

| Run No.[a] | KTA, mehm | Step III Time, minutes | Alpha-methylstyrene Conversion, weight % |
|---|---|---|---|
| 2[b] | 0.38 | 17 | 67 |
| 6 | 0.38 | 30 | 65 |
| 4[b] | 1.14 | 10 | 80 |
| 7 | 1.14 | 30 | 80 |

[a]Polymers prepared according to Recipe I, Example I.
[b]Runs 2 and 4 from Example I.

These data illustrate that the conversion of alpha-methylstyrene to polymer is not a function of polymerization time over the range 10 to 30 minutes.

EXAMPLE III

This example demonstrates the influence on alpha-methylstyrene conversion of "capping" the poly(alpha-methylstyryllithium) prior to polybutadiene block formation.

Polymers were prepared according to Recipe I with the exception that in control Run 8, no butadiene was added in Step II. The effect of capping on alpha-methylstyrene conversion is shown in Table III:

TABLE III

| Run No. | KTA, mehm | Butadiene Added in Step II[a] | Step III[a] Time, minutes | Alpha-Methylstyrene Conversion, Weight % |
|---|---|---|---|---|
| 1 | 0 | 2.5 parts by weight | 30 | 61 |
| 8 | 0 | 0 | 30 | 42 |

[a]See Recipe I from Example I.

These data demonstrate that failure to "cap" the poly(alpha-methylstyryllithium) prior to dilution and raising the temperature during polybutadiene block formation (Step III) results in a significantly lower alpha-methylstyrene conversion.

EXAMPLE IV

Alpha-methylstyrene-butadiene copolymers were prepared according to the general procedure of Recipe II:

| Recipe II | | | | |
|---|---|---|---|---|
| | Run No. | | | |
| | 9 | 10 | 11 | 12 |
| Step I | | | | |
| Alpha-methylstyrene, parts by wt. | 35.3 | 32.8 | 32.8 | 32.8 |
| Cyclohexane, parts by weight | 25.0 | 5.0 | 5.0 | 5.0 |
| n-Butyllithium, mehm | 1.5 | 1.0 | 1.0 | 1.0 |
| Tetrahydrofuran, parts by weight | 0.4 | 1.7 | 1.7 | — |
| Potassium t-amyloxide (KTA), mehm | — | — | 0.9 | 0.9 |
| Polymerization temperature, °C. | 30 | 30 | 30 | 30 |
| Polymerization time, minutes | 30 | 30 | 30 | 30 |
| Step II | | | | |
| 1,3-Butadiene, parts by weight | 2.5 | 1.4 | 1.4 | 1.4 |
| Cyclohexane, parts by weight | 62 | 51 | 51 | 51 |
| Polymerization temperature, °C. | 30 | 30 | 30 | 30 |
| Polymerization time, minutes | 30 | 30 | 30 | 30 |
| Step III | | | | |
| 1,3-Butadiene, parts by weight | 62.2 | 65.8 | 65.8 | 65.8 |
| Cyclohexane, parts by weight | 580 | 590 | 590 | 590 |
| Potassium t-amyloxide (KTA), mehm | 0.7 | — | — | — |
| Polymerization temperature, °C. | 70 | 70 | 70 | 70 |
| Polymerization time, minutes | 30 | 30 | 30 | 30 |

The conversion of alpha-methylstyrene to polymer, the weight percent alpha-methylstyrene in the final polymer, and the weight percent block poly(alpha-methylstyrene) in the final polymer for the four polymers prepared according to Recipe II are shown in Table IV:

TABLE IV

| Run No. | Step THF Added | Step KTA Added | Conversion, Weight % | Alpha-methylstyrene Weight % In Polymer | Block Weight % |
|---|---|---|---|---|---|
| 9 | I | III | 80 | 33 | 25 |
| 10 | I | None added | 63 | 26 | 25 |
| 11 | I | I | 86 | 32 | 23 |
| 12 | None added | I | 75 | 30 | 8 |

Comparison of the above Run No. 9 with Run No. 4 in Table I of Example I shows that similar results were obtained even though the ratio of monomers, the amount of THF used, and the K:Li ratios differed widely for the two runs. In both runs 80 percent of the alpha-methylstyrene monomer was converted to polymer, with the addition of KTA in Step III resulting in essentially the same distribution of the poly(alpha-methylstyrene) as random and block polymer in the two runs. Run No. 10 demonstrates the poor conversion obtained when KTA is omitted from the recipe, essentially all the alpha-methylstyrene being incorporated as block polymer. This is in excellent agreement with Run No. 1 in Table I of Example I, again at different ratio of monomers, different THF level, and different K:Li ratios as mentioned above.

Run No. 11 demonstrates that addition of KTA in Step I with the THF results in high alpha-methylstyrene conversion, with about the same distribution of the poly(alpha-methylstyrene) between random and block polymer as is obtained when the KTA is added in Step III. These results would indicate that addition of KTA in Step I with THF is as effective, if not more so, in improving alpha-methylstyrene conversion than when the KTA is added in Step III.

Run No. 12, in which no THF was added, shows that KTA is not an effective initiation activator for alpha-methylstyrene, a significant amount of the unpolymerized alpha-methylstyrene from Step I being randomly polymerized with the butadiene to give a final polymer containing 22 percent random poly(alpha-methylstyrene) copolymer.

These data demonstrate that KTA can be added either in Step I or Step III to significantly improve alpha-methylstyrene conversion, and that KTA is not an effective alpha-methylstyrene initiation activator, and that an activator such as THF is required to effectively initiate the formation of block poly(alpha-methylstyrene).

The disclosure, including data, illustrate the value and effectiveness of my invention. The examples, the knowledge and background of the field of the invention and general principles of chemistry and other applicable sciences, have formed the bases from which the broad descriptions of the invention including the ranges of conditions and generic groups of operant components have been developed, which have formed the bases for my claims here appended.

I claim:

1. A copolymer of at least one alpha-methylstyrene-type monomer and at least one conjugated diene monomer characterized by a structure comprising at least one block of homopolymeric poly(alpha-methylstyrene-type monomer) capped with a small block from a conjugated diene monomer and at least one block of random poly(conjugated diene/alpha-methylstyrene-type monomer).

2. The copolymer of claim 1 containing one said homopolymer block and one said random block.

3. The copolymer of claim 1 which is a coupled copolymer containing at least two said homopolymer blocks and at least two said random blocks.

4. The copolymer of claim 1 which is a radially coupled copolymer.

5. The copolymer of any of claims 1, 2, 3, or 4 wherein said alpha-methylstyrene-type monomer is alpha-methylstyrene, and said conjugated diene is butadiene or isoprene.

6. The copolymer of claim 1 incorporating a ratio of about 95:5 to 5:95 weight ratio of conjugated diene:alpha-methylstyrene-monomer.

7. The copolymer according to claim 6 wherein said alpha-methylstyrene-type monomer contains 9 to 24 carbon atoms per molecule; and said conjugated diene monomer contains 4 to 12 carbon atoms per molecule.

8. The copolymer according to claim 7 wherein said alpha-methyl-styrene-type monomer is alpha-methylstyrene, alpha-methyl-4-butylstyrene, alpha-methyl-3,5-di-t-butylstyrene, alpha-methyl-3,4,5-trimethylstyrene, alpha-methyl-4-benzylstyrene, alpha-methyl-4-cyclohexylstyrene, or mixture; and said conjugated diene monomer is 1,3-butadiene, isoprene, 2,3-dimethyl-1,3-butadiene, 2-methyl-1,3-pentadiene, 2,3-dimethyl-1,3-pentadiene, 2-methyl-3-ethyl-1,3-pentadiene, 2-methyl-1,3-butadiene, or mixture.

9. The copolymer as defined by claim 3 or 4 wherein said copolymer is coupled by a polyepoxide, polyisocyanate, polyamine, polyaldehyde, polyketone, polyanhydride, polyester, polyhalide, polyvinyl aromatic, carbon monoxide, carbon dioxide, or monoester, wherein the functionality of said polyfunctional treating agent is at least 2.

10. The copolymer according to claim 4 coupled by silicon tetrachloride.

* * * * *